United States Patent [19]

Eastes et al.

[11] Patent Number: 4,582,748

[45] Date of Patent: Apr. 15, 1986

[54] GLASS COMPOSITIONS HAVING LOW EXPANSION AND DIELECTRIC CONSTANTS

[75] Inventors: Walter L. Eastes, Granville, Ohio; Don S. Goldman, Richland, Wash.

[73] Assignee: Owens-Corning Fiberglas Corporation, Toledo, Ohio

[21] Appl. No.: 573,910

[22] Filed: Jan. 26, 1984

[51] Int. Cl.$^4$ ............................................. C03C 13/00
[52] U.S. Cl. ............................... 428/283; 428/901; 501/35; 501/38; 501/66; 501/67
[58] Field of Search ........... 501/95, 35, 36, 37, 501/38, 4, 5, 66, 67, 69; 428/901, 283

[56] References Cited

U.S. PATENT DOCUMENTS

| | | | |
|---|---|---|---|
| 3,189,471 | 6/1965 | Thomas | 501/67 |
| 3,402,055 | 9/1968 | Harris et al. | 501/69 |
| 3,459,568 | 8/1969 | Rinehart | 501/69 |
| 3,795,524 | 3/1974 | Sowman | 501/95 |
| 3,899,340 | 8/1975 | Malmendier | 501/50 |
| 4,268,562 | 5/1981 | Bacon et al. | 428/283 |
| 4,325,724 | 4/1982 | Froberg | 501/35 |
| 4,372,347 | 2/1983 | Olson | 428/901 |
| 4,396,720 | 8/1983 | Beall et al. | 501/5 |
| 4,424,251 | 1/1984 | Sugishita | 428/901 |

FOREIGN PATENT DOCUMENTS

| | | | |
|---|---|---|---|
| 51-57165 | 5/1976 | Japan | 501/67 |
| 765244 | 1/1957 | United Kingdom | 501/35 |

Primary Examiner—Helen M. McCarthy
Attorney, Agent, or Firm—Ronald C. Hudgens; Robert F. Rywalski

[57] ABSTRACT

Glass fibers having suitable properties for reinforcing electrical laminates have a defined viscosity-liquidus relationship, a low coefficient of thermal expansion, a high elastic modulus, and a low dielectric constant.

7 Claims, No Drawings

GLASS COMPOSITIONS HAVING LOW EXPANSION AND DIELECTRIC CONSTANTS

BACKGROUND OF THE INVENTION

This invention pertains to glass compositions having low thermal expansion and low dielectric constant.

In one of its more specific aspects, this invention pertains to such glasses which can be fiberized to produce continuous, defect-free fibers.

Recently, there have been developed integrated circuits mounted in leadless ceramic chip carriers. Such circuits comprise a glass fiber-filled laminate, or board, with an electrical chip affixed thereto. It is important that the board has certain properties. One of these is that the board has the same, or nearly the same, coefficient of thermal expansion as the chip to prevent separation therebetween during operation. Also, it is important that the board have a low dielectric constant to allow high electrical signal propagation speeds.

To meet these requirements, the glass fibers which are employed should have a coefficient of thermal expansion (CTE) less than about 2.3 parts per million per Kelvin (ppm/K) and a linear, elastic (Young's) modulus greater than about 10 million pounds per square inch (Mpsi). Furthermore, the viscosity of the molten glass, expressed as the temperature at which the viscosity is 10 to the power 2.5 poise, is less than about 2850° F. and the liquidus temperature should be 300° F. or more below this viscosity. The dielectric constant should be less than about 6 at 1 million Hertz (MHz).

The following glass types are known in the trade and typically have the following properties:

|  | E glass | S glass | Silica glass |  |
|---|---|---|---|---|
| CTE | 5.0 | 2.2 | 0.6 | ppm/K |
| Modulus | 10.5 | 13.0 | 10.0 | Mpsi |
| Viscosity | 2400 | 2890 | — | °F. |
| Liquidus temp. | 2000 | 2700 | 3100 | °F. |

Each of these glass types fails to meet all of the requirements in some important way. For example, E glass has a low viscosity and liquidus temperature but an unacceptable CTE. Silica (silicon dioxide) glass fibers have a very low thermal expansion coefficient but have a low modulus and such a high viscosity and liquidus temperature that they may not be fiberized from the melt.

Furthermore, the properties of the aforementioned glasses are typical of the commonly known silicate glasses. Low thermal expansion is generally associated with glasses with high silica content such as silica and S glass. But such glasses usually have such very high viscosity or liquidus temperature or both. Thus, it is surprising that all of the aforementioned properties could be simultaneously met in a silicate glass composition.

The glass of this invention meets those requirements.

STATEMENT OF THE INVENTION

According to this invention there is provided a glass composition having a viscosity from about 2700° F. to about 2850° F. and a coefficient of thermal expansion within the range of from about 1 to about 2.3, a liquidus from about 2300 to about 2590 and a dielectric constant less than about 6.

Also, in accordance with this invention there is provided a glass batch which consists essentially, in parts by weight, of the following:
- $SiO_2$: from about 50 to about 65
- $Al_2O_3$: from about 10 to about 25
- MgO: up to about 15
- $B_2O_3$: from about 5 to about 15
- $TiO_2$: up to about 5
- ZnO: up to about 5

Also, in accordance with this invention there is provided a reinforced laminate comprising the above defined glass and a suitable resin.

DETAILED DESCRIPTION OF THE INVENTION

The glass batch employed in this invention is formed of readily available ingredients which can be compounded in the usual manner. The batch can be introduced into the melter and melted and formed into fibers in any suitable method to produce continuous fibers or fibers of any suitable length.

The fibers can be employed in the usual manner to reinforce any suitable substrate. Such substrates can include both thermoplastic or thermosetting resins, or combinations thereof. The reinforced laminate can include bulk molding compounds, sheet molding compounds, and the like.

In one preferred embodiment of this invention, the glass batch is formulated of suitable materials to produce glass fibers which consist essentially, in parts by weight (pbw), of silicon dioxide in an amount of about 62, of aluminum oxide in an amount of about 20, of magnesium oxide in an amount of about 8 and boric oxide in an amount of about 10.

In another preferred embodiment of this invention, the glass fibers will consist essentially of about 62 pbw silicon dioxide, about 16 pbw of aluminum oxide, about 8 pbw of magnesium oxide, about 8 pbw of boric oxide, about 3 pbw titanium dioxide and about 3 pbw of zinc oxide.

The glass will be readily fiberizable into uniform, substantially defect-free fibers having a coefficient of thermal expansion within the range of from about 1.5 to about 2.2, will have a dielectric constant less than about 6, will have a viscosity within the range of from about 2790° to about 2830° F. and a liquidus of from about 2300° F. to about 2500° F.

EXAMPLE I

Two glasses were formed having the following composition and properties.

| Component, pbw | Invention I | Invention II |
|---|---|---|
| $SiO_2$ | 62 | 62 |
| $Al_2O_3$ | 20 | 16 |
| MgO | 8 | 8 |
| $B_2O_3$ | 10 | 8 |
| $TiO_2$ | — | 3 |
| ZnO | — | 3 |

The raw materials employed in the glass batches from which these glasses were formed were as follows:
- $SiO_2$—Flint
- $Al_2O_3$—Calcined alumina
- MgO—Calcined magnesite
- $B_2O_3$—Anhydrous boric acid
- $TiO_2$—Rutile ZnO—Zinc Oxide The glasses were also formulated from essentially pure oxides and boric acid to produce glasses with equivalent composition and properties.

The glasses produced had the following properties:

| Property | Invention I | Invention II |
|---|---|---|
| Viscosity (1), °F. | 2828 | 2794 |
| Liquidus, °F. | 2477 | 2301 |
| Primary Phase | Mullite | Cristoballite |
| CTE (2) | 2.1 | 1.7 |
| DC (3) | 5.0 | 5.0 |
| Modulus, Mpsi | 10.3 | 14.2 |

(1) Temperature at which the viscosity is $10^{2.5}$ poise.
(2) Coefficient of Thermal Expansion ppm/K.
(3) Dielectric Constant 1MHz.

EXAMPLE II

The invention glasses I and II prepared in Example were compared to other glasses of the indicated compositions with the following results.

| | PROPERTIES | | | | COMPOSITION, pbw. | | | | | | |
|---|---|---|---|---|---|---|---|---|---|---|---|
| Glass | CTE, ppm/K | Visc. °F. | D.C. 1 MH$_z$ | Liquidus Temperature, °F. | SiO$_2$ | Al$_2$O$_3$ | MgO | B$_2$O$_3$ | TiO$_2$ | ZnO | F$_2$ |
| Inv. I | 2.1 | 2828 | 5.0 | 2477 | 62 | 20 | 8 | 10 | 0 | 0 | 0 |
| 91 | 2.0 | 2887 | 5.3 | 2693 | 65 | 25 | 10 | 0 | 0 | 0 | 0 |
| 92 | 3.1 | 2613 | — | 2429 | 62 | 17 | 21 | 0 | 0 | 0 | 0 |
| 94 | 2.5 | 2779 | 4.9 | 2295 | 62 | 17 | 11 | 10 | 0 | 0 | 0 |
| 26 | 2.0 | 2971 | 4.8 | 2153 | 70.12 | 0.16 | 5.13 | 20 | 3.0 | 0 | |
| Inv. II | 1.7 | 2794 | 5.0 | 2301 | 62 | 16 | 8 | 8 | 3 | 3 | 0 |
| 41 | 2.5 | 2819 | 5.1 | 2420 | 62 | 14 | 8 | 8 | 3 | 3 | 2.0 |

From these data, it is seen that only glasses Inv. I and Inv. II, the glasses of the invention, meet the criteria established as being satisfactory for the purposes for which the glasses of this invention are intended.

It will be evident from the foregoing that various modifications can be made to this invention in that the glass compositions may be varied about those disclosed in Examples I and II with consequent, regular variations in the properties. Such modifications, however, are considered to be within the scope of the invention.

We claim:

1. A magnesia boroaluminosilicate glass fiber consisting essentially of, in approximate weight percent, 50–65% by weight SiO$_2$, 10–25% Al$_2$O$_3$, 5–15% B$_2$O$_3$ and less than 15% MgO, said glass fiber optionally including less than 5% TiO$_2$ and less than 5% ZnO, the weight ratio of Al$_2$O$_3$/MgO being from 2.0 to 2.5, the composition being selected such that said glass fiber has a coefficient of thermal expansion of from about 1 to about 2.3 (ppm/K), an elastic modulus greater than about 10 (M psi), a dielectric constant of less than about 6, a viscosity (in poise) of 10 to the 2.5 power at a temperature between about 2790° F. and about 2830° F., and a liquidus temperature between about 2300° F. to about 2500° F., the liquidus temperature being 300° F. or more below the temperature at which glass has viscosity of $10^{2.5}$ poise.

2. A laminate comprising the magnesia boroaluminosilicate glass fiber defined in claim 1.

3. The laminate of claim 2 in combination with a ceramic chip and forming an integrated circuit.

4. The glass fiber of claim 1 consisting essentially in parts by weight of about 62 parts silicon dioxide, about 20 parts aluminum oxide, about 8 parts magnesium oxide, and about 10 parts boric oxide, said glass fiber having a viscosity (in poise) of 10 to the 2.5 power at a temperature of about 2828° F., a liquidus temperature of about 2477° F., a coefficient of thermal expansion of about 2.1, a dielectric constant of about 5 and an elastic modulus of about 10.3.

5. The glass fiber of claim 1 consisting essentially in parts by weight of about 62 parts silicon dioxide, about 16 parts aluminum oxide, about 8 parts magnesium oxide, about 8 parts of boron oxide, about 3 parts titanium dioxide and about 3 parts zinc oxide, wherein said glass fiber has a viscosity (in poise) of 10 to the 2.5 power at a temperature of about 2794° F., a liquidus temperature of about 2301° F., a coefficient of thermal expansion of about 1.7, a dielectric constant of about 5 and an elastic modulus of about 14.2.

6. A glass fiber-filled substrate comprising the magnesia boroaluminosilicate glass fiber of claim 4 or 5.

7. The glass fiber-filled substrate of claim 6 in combination with a ceramic chip and forming an integrated circuit.

* * * * *